United States Patent [19]

Greenlaw

[11] Patent Number: 5,002,520

[45] Date of Patent: Mar. 26, 1991

[54] BICYCLE DRIVE CHAIN GUIDE

[76] Inventor: John W. Greenlaw, 4120 Morgan Territory Rd., Clayton, Calif. 94517

[21] Appl. No.: 450,848

[22] Filed: Dec. 14, 1989

[51] Int. Cl.⁵ .............................................. F16H 7/18
[52] U.S. Cl. .................................... 474/140; 474/144
[58] Field of Search ............... 474/140, 144, 165, 166; 280/238, 250, 261, 304.3, 160, 160.1; 74/608, 609

[56] References Cited

U.S. PATENT DOCUMENTS 3,813,957  6/1974  Huret et al. ........................ 474/140
4,786,071  11/1988  Nagano ............................. 474/140
4,832,667  5/1989  Wren .................................. 474/140

Primary Examiner—Hoang C. Dang
Attorney, Agent, or Firm—Bruce & McCoy

[57] ABSTRACT

A bicycle drive chain guide for bicycles having gear shifting capability wherein the guide can be secured to the bicycle frame and has a curved surface which prevents the chain from derailing during a gear shift.

5 Claims, 3 Drawing Sheets

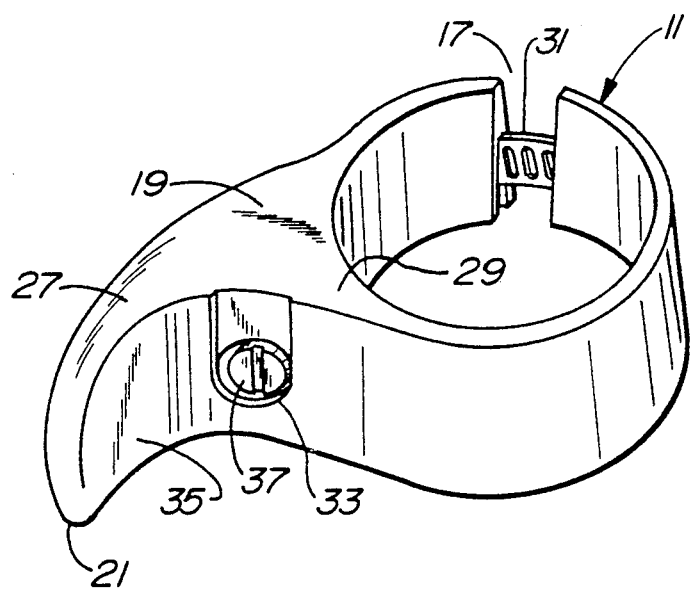
FIG._1
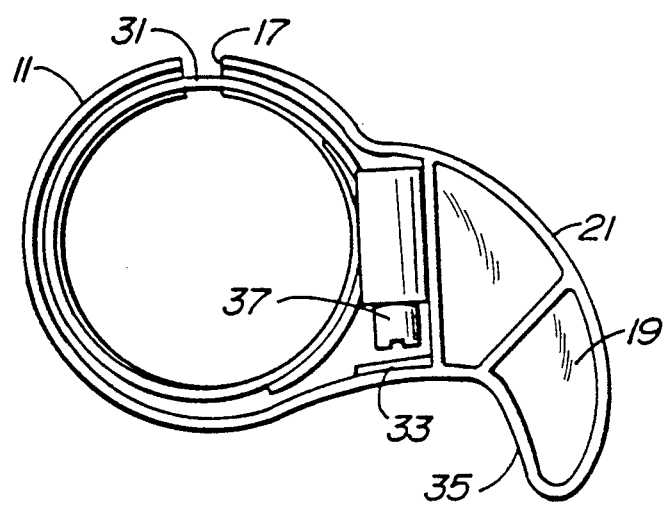
FIG._2

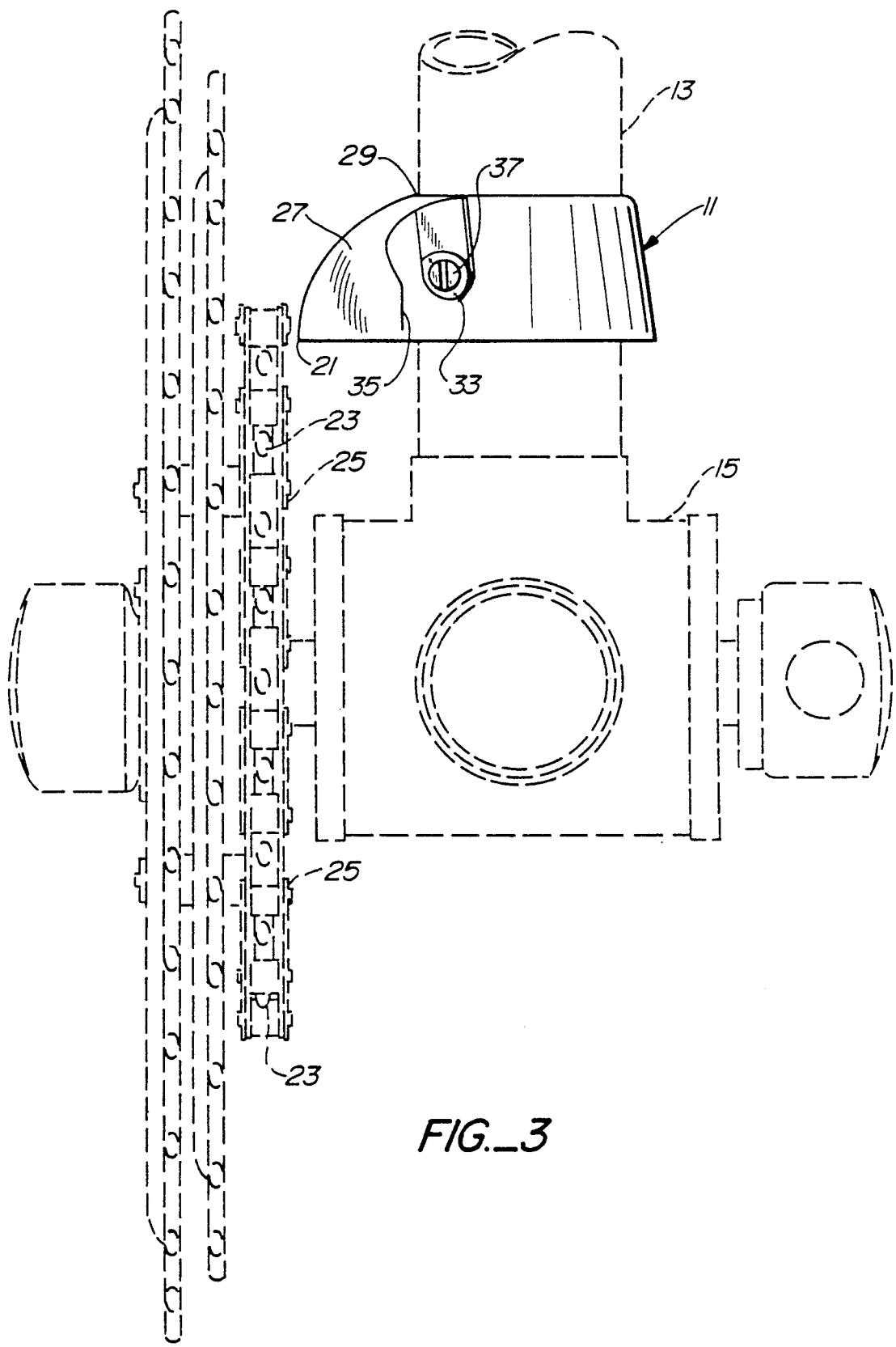
FIG._3

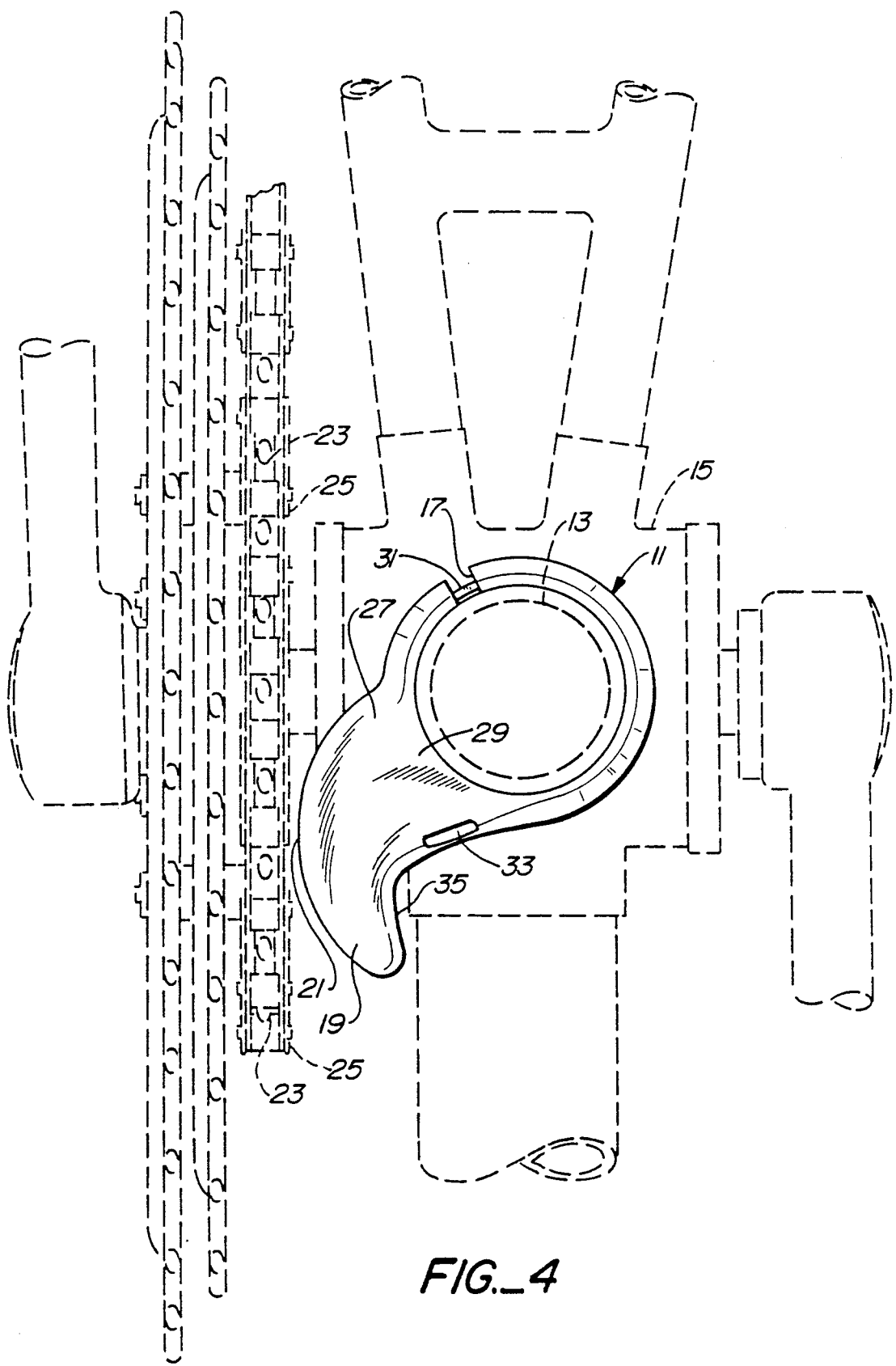
FIG._4

BICYCLE DRIVE CHAIN GUIDE

BACKGROUND OF THE INVENTION

1. FIELD OF THE INVENTION

The present invention relates to bicycle drive chain guides, and more particularly, it relates to a drive chain guide for bicycles having gear shifting capability wherein the guide keeps the chain on the sprocket during a gear shift to the inner chain ring and can be adjusted with respect to its location adjacent to the chain for preventing it from derailing.

2. DESCRIPTION OF THE PRIOR ART

The only known prior art bicycle drive chain guide is a metal bar which can be secured to the frame of the bicycle and fixed in position proximate the chain whereby as a chain begins to derail from the inner sprocket, the bar restricts the chain displacement whereby it is guided to stay in alignment on the inner chain ring or drive sprocket. A metal bar is a very crude guide and does not offer a range of positioning adjustment except by squeezing a rubber mount during tightening of the mounting bolts which thereby adjusts the positioning of the guide with respect to its attachment to the bicycle frame to a small degree very inaccurately. Different sized units must be used for different diameters of bicycle frame tubing. The prior art does not provide a device with a wide range of adjustment which is easily secured in position to a range of bicycle frame tubing sizes and quickly and easily adjusted with respect to its spacing to the bicycle drive chain.

SUMMARY OF THE INVENTION

The present invention is a bicycle drive chain guide which is essentially a one-piece molded integral unit apart from its fastening means. It includes a bicycle frame encircling base portion with means for accommodating different diameter tubing used for bicycle frames. The base portion has a thumb portion which projects radially outward from its nexus with the base portion with the tip of the thumb spiraling away from the radially projecting nexus portion of the thumb. The tip of the thumb has a curved surface which can be positioned adjacent a bicycle drive chain with a gap between the chain and the curved surface of the thumb being adjustable by rotating the base portion around its attachment to the bicycle frame. An attachment means is provided for securing the base portion to a bicycle frame with variable orientations.

OBJECTS OF THE INVENTION

It is therefore an important object of the present invention to provide a bicycle drive chain guide which can be easily secured to different diameter tubing used for bicycle frames.

It is another object of the present invention to provide a bicycle drive chain guide which can be infinitely adjusted with respect to the gap formed between the guide and the bicycle drive chain by simple rotation of the guide about its securement to the bicycle frame.

It is a further object of the present invention to provide a bicycle drive chain guide which can be adjusted by the operator through the simple use of a screwdriver.

It is still another object of the present invention to provide a bicycle drive chain guide which is relatively inexpensive to manufacture as a single piece molded unit which utilizes simply a hose clamp for its attachment to the bicycle frame.

And it is still a further object of the present invention to provide a bicycle drive chain guide which has a configuration which contacts an untracking chain with a smooth compound curved surface to provide a multiple directional guide force to an errant chain path of movement directing the chain path back onto the drive sprocket.

Other objects and advantages of the present invention will become apparent when apparatus of the present invention is considered in conjunction with the accompanying drawings.

DESCRIPTION OF THE DRAWINGS

FIG. 1 is a perspective view of the bicycle drive chain guide of the present invention;

FIG. 2 is a bottom plan view thereof;

FIG. 3 is a front elevation thereof showing the guide mounted on a bicycle frame represented by phantom lines; and FIG. 4 is a top plan view thereof showing the guide mounted in position on a bicycle frame represented by phantom lines.

DESCRIPTION OF THE PREFERRED EMBODIMENT

Reference is made to the drawings for a description of the preferred embodiment of the present invention wherein like reference numbers represent like elements on corresponding views.

FIGS. 1-4 illustrate the overall configuration of the bicycle drive chain guide of the present invention. It is an integrally molded overall smooth surfaced unit. It has a bicycle frame encircling base portion 11 which is essentially circular internally for encircling the main support tube 13 of a bicycle frame projecting upward from the pedal crank journal 15. Means are provided for accommodating different diameter bicycle frames by providing an expansion gap 17 in the frame encircling base portion which allows inner the circumference thereof to expand or contract to accommodate the different size diameters of bicycle frame tubing.

The base portion 11 of the guide is provided with a thumb 19 which projects radially outward from its nexus with the base portion. The projecting thumb transitions into a configuration which has a leading edge 21 which spirals away from the radially projecting portion to a terminus which approaches spiraling back inward toward the base portion. The spiral does not start inward until it has reached the plane of the closest vertical edge of the drive chain track when the guide is mounted on the bicycle frame and oriented to project toward the chain drive sprocket 23. This configuration allows the guide to be positioned adjacent to a bicycle drive chain 25 with an infinitely adjustable gap between the chain and the guide. The rearward facing face of the chain guide has a compound curved surface 27 emanating upward from the leading edge 21 which permits a chain contacting said surface to slide inward toward the chain sprocket 23 as it slides down the surface. In other words, the compound curved surface slopes from the top of the guide inward toward the chain drive sprocket and toward the lower edge of the guide whereby as a drive chain departs from its normal track with a motion which would derail the chain to the inside of the sprocket between the sprocket and the bicycle frame, the drive chain will contact the curved surface of the chain guide and be directed back toward the sprocket as it drops down the curved surface and is directed back outward toward the sprocket.

The gap between the chain 25 and the curved surface 27 of the thumb 19 is adjustable by rotating the base portion 11 of the guide around its attachment to the bicycle frame 13. The spiral design of the projecting thumb allows the curved surface to always be disposed adjacent to the drive chain 25 and there are no corners or sharp edges for the drive chain to catch on as it moves past the chain guide. The curved surface of the thumb portion is also tapered away from the leading edge 21 toward the top of the guide 29 in a smooth curve which blends into the top surface along the length of the projecting thumb. The most radially projecting edge, the leading edge 21, is the lower edge of the chain guide when it is in operating position.

The chain guide is provided with an attachment means which is essentially a hose clamp 31 that is disposed internally of the base portion which is best illustrated in FIG. 2. In the preferred embodiment of the present invention, the guide is hollow and the hose clamp is located in surrounding relation around an inner wall of the guide which surrounds and contacts the bicycle frame. A hole 33 is provided in the rear side 35 of the projecting thumb for the purpose of permitting a screwdriver to be inserted through the wall to engage and actuate the hose clamp adjustment screw 37.

In operation, the chain guide is adjusted to be disposed proximate the chain whereby if the chain tends to lift off of the sprocket and inward toward the bicycle frame, it will contact the curved surface of the chain guide and be directed in a path back in alignment with the chain sprocket.

Thus, it will be apparent from the foregoing description of the invention, in its preferred form, that it will fulfill all the objects and advantages attributable thereto. While it is illustrated and described in considerable detail herein, the invention is not to be limited to such details as have been set forth except as may been necessitated by the appended claims.

I claim:

1. A bicycle drive chain guide comprising
   a molded integral unit having a bicycle frame encircling base portion with means for accommodating different diameter bicycle frames, said base portion having a thumb portion which projects radially outward from its nexus with said base portion with the tip of said thumb spiraling away from the radially projecting nexus portion of said thumb, the tip of said thumb having a curved surface which can be positioned adjacent a bicycle drive chain with the gap between the chain and the curved surface of the thumb being adjustable by rotating the base portion of the guide around its attachment to the bicycle frame, and
   attachment means for securing said base portion to a bicycle frame with variable orientations thereto.

2. The bicycle drive chain guide of claim 1 wherein the attachment means includes a hose clamp fitting disposed internally of said base portion.

3. The bicycle drive chain guide of claim 2 wherein the guide is hollow and the hose clamp is located in surrounding relation around an inner wall of the guide which surrounds the bicycle frame, said base portion having an expansion gap which allows said guide to accommodate to different diameter bicycle frame tubing.

4. The bicycle drive chain guide of claim 3 wherein the curved surface of the thumb portion is also tapered from the bottom edge thereof toward the top surface thereof in a smooth receding curve which blends into the top surface along the length of the projecting thumb forming a compound curved surface on said thumb which slopes from the top of the guide inward toward the chain drive sprocket to the lower edge of the guide whereby as a drive chain departs from its normal track with a motion which would derail the chain to the inside of the sprocket between the sprocket and the bicycle frame, the drive chain will contact the compound curved surface of the chain guide and be directed back outward towards the sprocket as it drops down the curved surface.

5. A bicycle drive chain guide comprising
   a hollow molded integral unit having a bicycle frame encircling base portion formed with an inner wall and an expansion gap for surrounding different diameters of bicycle frame tubing, said base portion having top and bottom surfaces a thumb which projects radially outward from a nexus with said base portion and a leading edge on the bottom surface of said thumb spiraling away from the radially projecting nexus portion of said thumb, the leading edge of said thumb forming a portion of a compound curved surface projecting upward therefrom away from the location of the drive chain, said thumb portion being positionable adjacent to a bicycle drive chain with the gap between the chain and the curved surface of the thumb being adjustable by rotating the base portion of the guide around its attachment to the bicycle frame, said compound curved surface of the thumb portion also being tapered from the leading edge on the bottom surface thereof toward the upper surface thereof in a smooth curve which blends into the upper surface along the length of the projecting thumb, and
   attachment means for securing said base portion to a bicycle frame including a hose clamp fitting disposed internally of said base portion around said inner wall of the guide which is formed for surrounding the bicycle frame with variable orientations thereto.

* * * * *

UNITED STATES PATENT AND TRADEMARK OFFICE
CERTIFICATE OF CORRECTION

PATENT NO. : 5,002,520

DATED : March 26, 1991

INVENTOR(S) : John W. Greenlaw

It is certified that error appears in the above—identified patent and that said Letters Patent is hereby corrected as shown below:

In Claim 5, column 4, line 33, delete the phrase --top and bottom surfaces--.

Signed and Sealed this

Fourth Day of August, 1992

*Attest:*

DOUGLAS B. COMER

*Attesting Officer*     *Acting Commissioner of Patents and Trademarks*